United States Patent [19]

Huff

[11] Patent Number: 5,700,978

[45] Date of Patent: Dec. 23, 1997

[54] SNAP-TOGETHER WALL PLATES FOR GANGED ELECTRICAL DEVICE INSTALLATIONS

[75] Inventor: Bob E. Huff, Gastonia, N.C.

[73] Assignee: Pass & Seymour, Inc., Syracuse, N.Y.

[21] Appl. No.: 591,286

[22] Filed: Jan. 25, 1996

[51] Int. Cl.⁶ .................................................. H05K 5/03
[52] U.S. Cl. .......................... 174/66; 220/3.94; 220/241
[58] Field of Search ......................... 174/66, 49; 220/3.3, 220/3.8, 3.94, 241

[56] References Cited

U.S. PATENT DOCUMENTS

| | | | |
|---|---|---|---|
| 801,536 | 10/1905 | Marshall | 220/241 |
| 1,717,871 | 6/1929 | Both | 220/241 |
| 4,428,492 | 1/1984 | Jorgensen | 220/3.94 |
| 4,631,354 | 12/1986 | Boteler | 174/66 |
| 4,733,330 | 3/1988 | Tanaka et al. | 220/3.8 X |
| 4,896,784 | 1/1990 | Heath | 220/3.8 X |
| 4,972,045 | 11/1990 | Primeau | 174/66 |
| 5,547,095 | 8/1996 | Sonntag et al. | 220/3.8 |

Primary Examiner—Kristine L. Kincaid
Assistant Examiner—Dean A. Reichard
Attorney, Agent, or Firm—Bond, Schoeneck & King, LLP

[57] ABSTRACT

A wall plate for snap-fit engagement with an identical wall plate on one or both sides to provide an assembly of side-by-side plates for use with a ganged installation of electrical wiring devices. The plate is rectangular with a rearwardly extending flange, including a pair of side walls having inner and outer surfaces, extending about its periphery. A U-shaped tab, having a medial portion including a linear-edged shoulder parallel to and spaced from the adjacent side wall, extends outwardly from the outer surface of each side wall. A rectangular opening in each side wall is positioned laterally opposite the tab on the other side wall. As two plates positioned with the rear edges or surfaces of their flanges in a common plane are moved linearly toward engagement of the outer surfaces of opposing side walls, the tab extending from each opposing side wall is received in the opening in the other side wall. An angled surface terminating at the shoulder of each tab contacts one edge of the opening in the other plate as movement progresses. When the shoulders move past the edges of the opening, the tabs return to their unflexed positions, thus providing a snap fit coupling of the laterally adjacent plates.

18 Claims, 3 Drawing Sheets

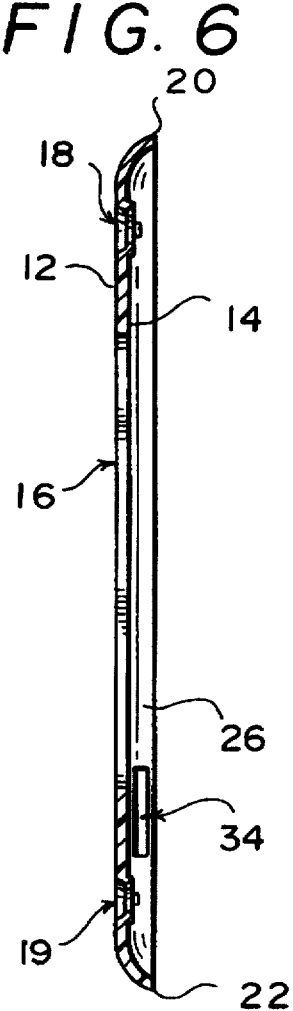
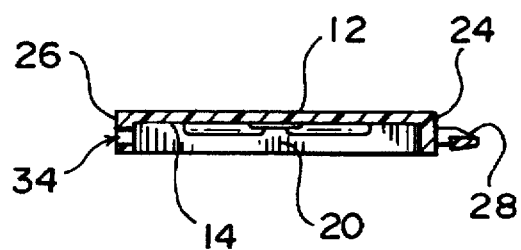
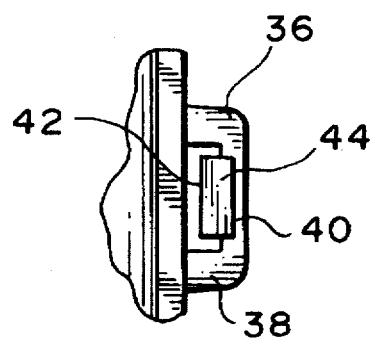
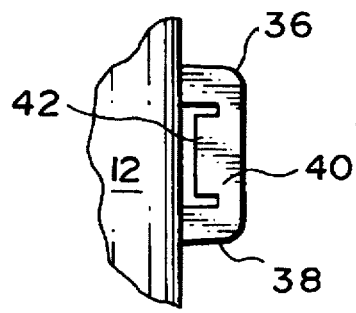
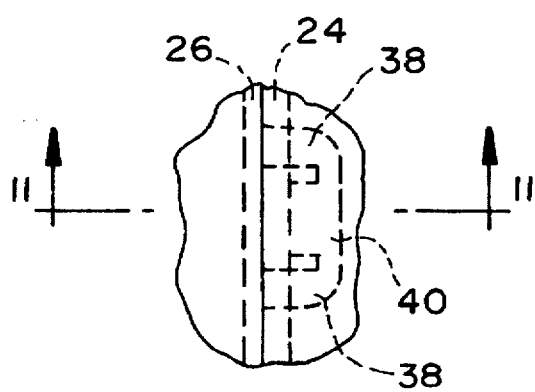
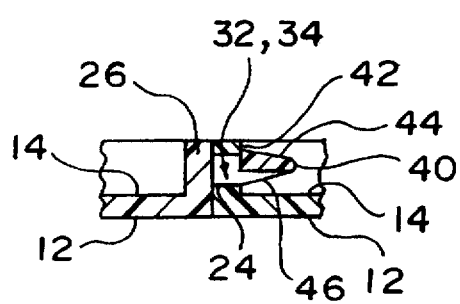

SNAP-TOGETHER WALL PLATES FOR GANGED ELECTRICAL DEVICE INSTALLATIONS

BACKGROUND OF THE INVENTION

The present invention relates to wall plates for electrical wiring devices and, more particularly, to wall plates adapted for snap-fit connection to identical, laterally adjacent plates for installation on ganged, side-by-side devices.

Wall box mounted devices such as switches and receptacles are commonly provided with a wall plate serving both as a decorative cover for the device and to prevent access to the areas which contain the electrical wiring. Such wall plates are usually mounted upon the device by one or more screws passing through openings in the plate and received in a threaded aperture in the device. In some installations, two or more devices are mounted in side-by-side relation with a corresponding wall plate for each device. Examples of wall plates, sometimes termed faceplates, for ganged installations or other wall plates having side-by-side sections are found in U.S. Pat. Nos. 801,536, 1,550,870, 1,717,871, 2,212,145, 3,735,020, 4,631,354, 4,835,343 and 4,972,045.

It is a principal object of the present invention to provide a novel and improved wall plate for cooperative engagement with laterally adjacent, identical wall plates on one or both sides for use in ganged electrical wiring device installations.

Other objects will in part be obvious and will in part appear hereinafter.

SUMMARY OF THE INVENTION

The wall plate of the invention, in the disclosed embodiment, is rectangular in outline, having a rearwardly extending, peripheral flange defining parallel, planar, side walls. A tab extends integrally outwardly from each side wall, and a rectangular opening is formed in each side wall, longitudinally spaced from the tab. The tabs on each side wall are positioned laterally opposite an opening in the other side wall, whereby two identical plates may be placed side-by-side and moved together with the tab on each of the mutually facing side walls being received in the opening of the other side wall.

The tabs are generally U-shaped, being connected to the side wall at the end of each leg. A shoulder is formed in the medial portion of the tab with a lip spaced from and extending parallel to the plane of the side wall. The tabs have a limited degree of flexibility and are configured cooperatively with the openings to effect a snap-fit engagement with identical plates as the tabs of each plate are inserted into the openings in the other. As many plates as are appropriate for the ganged wall device installation may be thus assembled. Preferably, end plates having a tab and opening on only one side are employed with the outermost end walls of the assembled plates being contoured to provide a trim and finished appearance.

The foregoing and other features and advantages of the invention will be more readily understood and fully appreciated from the following detailed description, taken in conjunction with the accompanying drawings.

BRIEF DESCRIPTION OF THE DRAWINGS

FIGS. 6 and 7 are elevational views in section on the lines 6—6 and 7—7 of FIG. 3, respectively;

FIGS. 8 and 9 are fragmentary, rear and front elevational views of portions of the plate as seen from the positions indicated in FIG. 4 by lines 8—8 and 9—9, respectively;

FIG. 10 is a fragmentary, front elevational view of portions of two laterally adjacent plates, illustrating the nature of the coupling therebetween; and FIG. 11 is an elevational view in section on the line 11—11 of FIG. 10.

DETAILED DESCRIPTION

Figure 1:
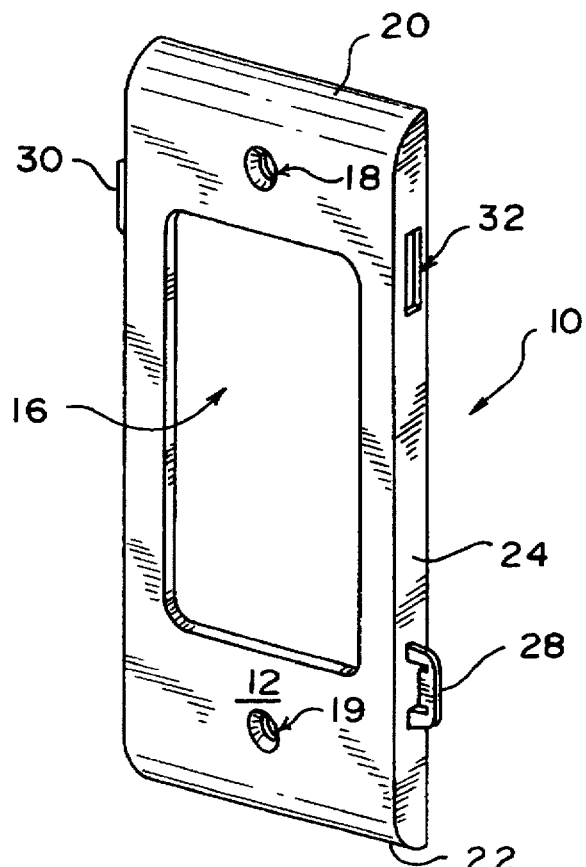
FIG. 1 is a perspective view of a wall plate embodying the present invention.
Figure 5:
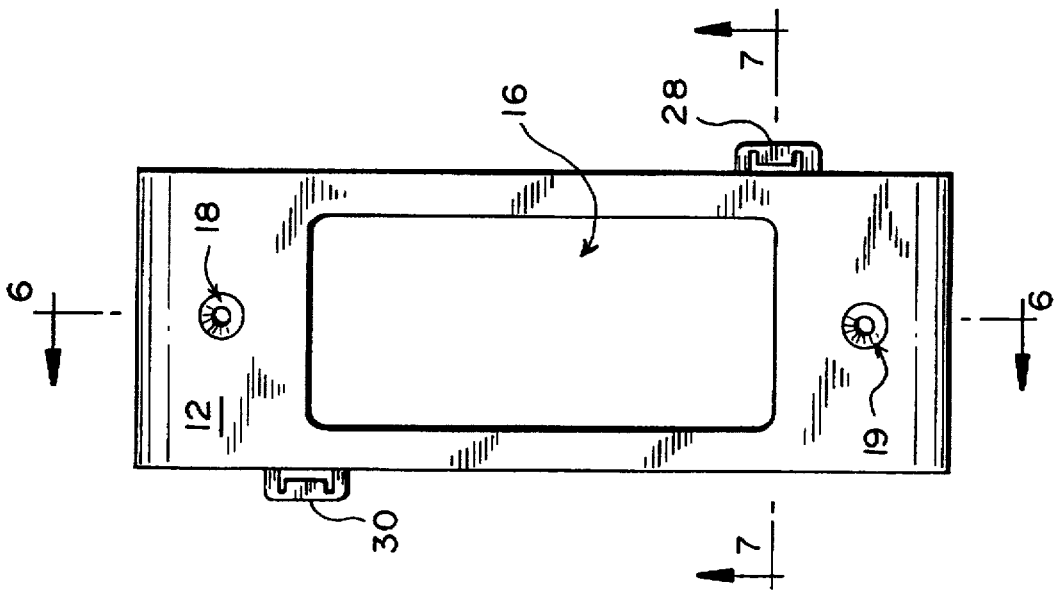
FIGS. 3–5 are front, side and rear elevational views, respectively, of the wall plate of FIG. 1.
Figure 4:
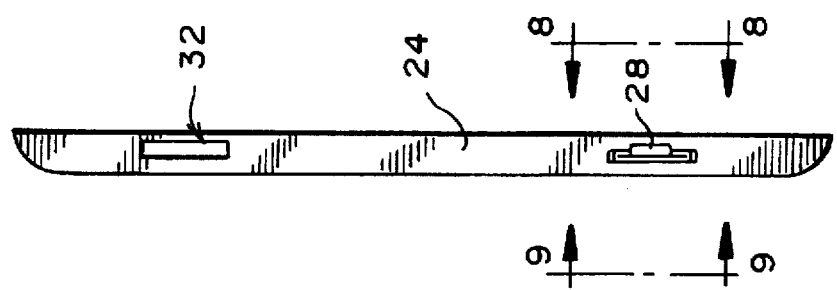
Figure 3:
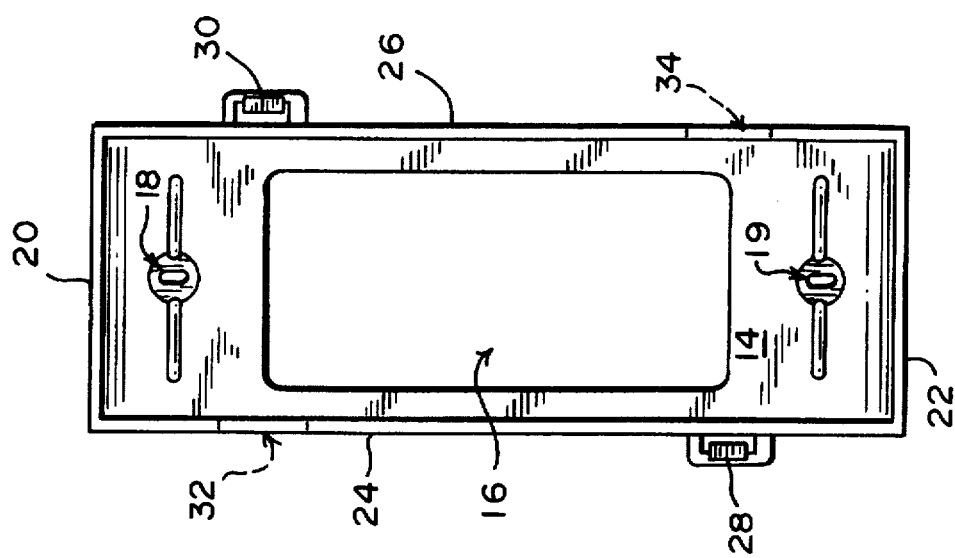

Referring now to the drawings, in FIG. 1 is shown a wall plate, denoted generally by reference numeral 10, embodying the present invention. The main body of plate 10 comprises front surface 12, rear surface 14 (FIG. 5), centrally disposed opening 16 and a pair of smaller openings 18 and 19 disposed above and below, respectively, central opening 16. It will be understood that the configurations, placement and number of openings 16, 18 and 19 are for illustrative purposes only, and will generally be dictated by the nature of the wiring device with which plate 10 is to be used. For example, if the device is a duplex receptacle with a pair of spaced, plug-receiving portions, a pair of spaced openings may replace opening 16 and a single, central opening may replace openings 18 and 19. In any case, opening 16 is intended to surround an exposed portion of the wiring device, and openings 18 and 19 are provided for passage of screws to mount the plate to the device.

A flange extends rearwardly about the entire periphery of plate 10, comprising curved, upper and lower walls 20 and 22, respectively, and a pair of side walls 24 and 26, each having an inner and an outer surface. Identical tabs 28 and 30, formed integrally with plate 10, extend outwardly from the outer surfaces of side walls 24 and 26, respectively. Through openings 32 and 34, having identical, rectangular peripheries, are formed in side walls 24 and 26, respectively, spaced from tabs 28 and 30. Tabs 28 and 30 are positioned laterally opposite openings 34 and 32, respectively, both the tabs and the openings being elongated in directions parallel to the longitudinal edges of side walls 24 and 26.

The structure of tabs 28 and 30 is seen more clearly in FIGS. 8 and 9, and the manner of their cooperation with openings 32 and 34 in FIGS. 10 and 11. The tabs are of generally U-shaped configuration, each having a pair of legs 36 and 38 extending integrally from the respective side walls and joined by medial portion 40. The central part of medial portion 40 extends toward the adjacent side wall and has a linear edge defining a shoulder 42 parallel to and spaced from the side wall by a distance slightly greater than the thickness of the side walls. Tolerances are established such that the spacing of shoulder 42 from the outer surface of side wall 24 or 26 will be a minimum and maximum of, for example, 0.002" and 0.010", respectively.

The rearwardly facing, outer surface 44 (FIGS. 8, 11) of medial portion 40, including the central part which extends inwardly toward the side wall, is angled from the plane of adjacent surface portions of tabs 28 and 30 outwardly toward the rear. That is, shoulder 42 lies in a plane closer to the plane of the rear surfaces of side walls 24 and 26 than does the plane of the rear surfaces of legs 36 and 38. It may be seen in FIG. 11 that the legs of the tabs have a thickness (the distance between their front and rear surfaces) slightly less than the height of openings 32 and 34 in the portions extending outwardly from side walls 24 and 26 for a distance approximately equal to the thickness of the side walls; in these portions, the front and rear tab surfaces are parallel to one another and perpendicular to the outer surfaces of the side walls. The forwardly facing surface 46 (FIG. 11) of each leg extending outwardly from the aforementioned portions is angled toward the rear of the plate, medial portion 40 having a maximum thickness somewhat less than the height of openings 32 and 34.

Figure 2:
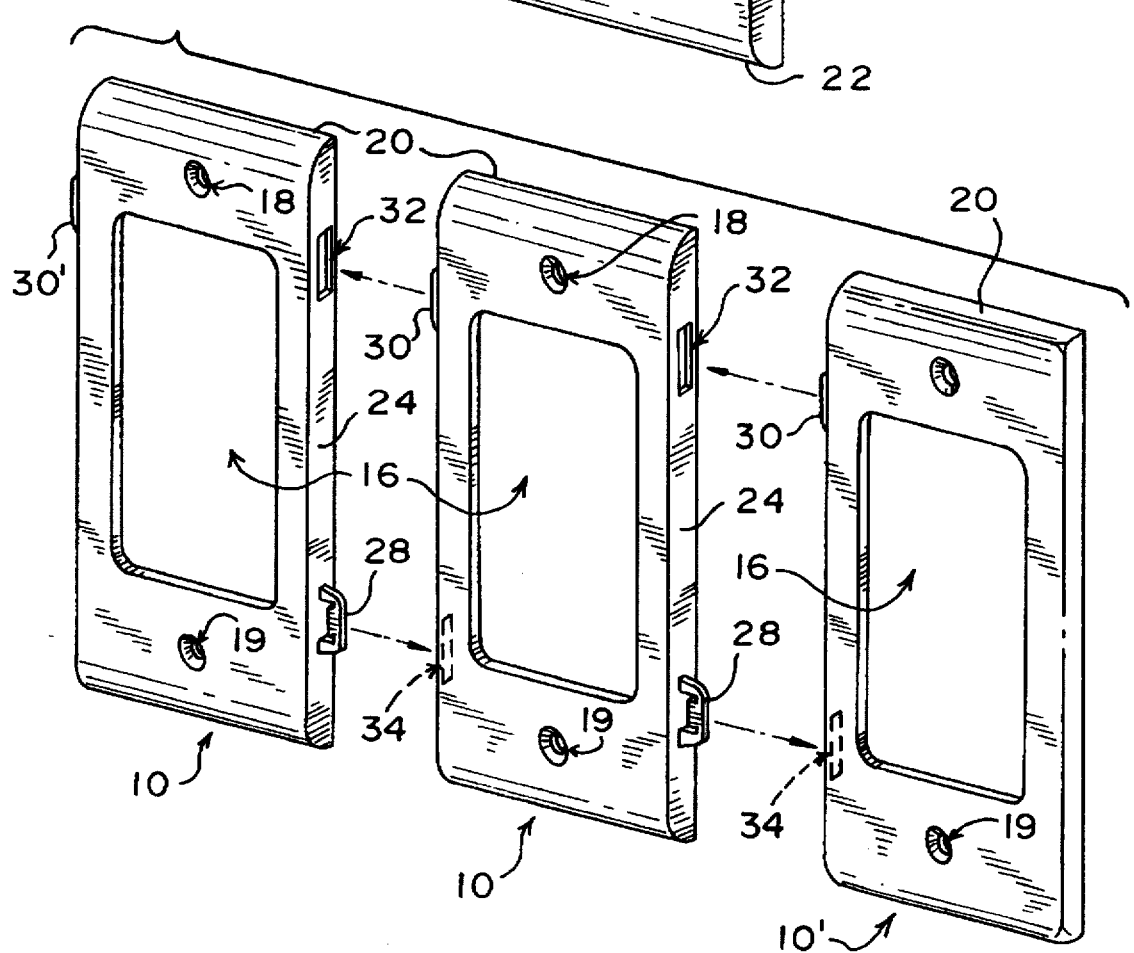
FIG. 2 is a perspective view of three of the wall plates of FIG. 1, positioned for mutual assembly.

As seen in FIG. 2, when a plurality of plates 10 are placed in side-by-side relation with their upper and lower edges aligned, tab 28 on each plate will be laterally aligned with opening 34 of the plate to its right, and tab 30 will be aligned with opening 32 of the plate to its left, if any. When the rear surfaces of the flanges of adjacent plates are in a common plane, the positioning and dimensions of the tabs and openings are such that as the plates are moved laterally toward one another, tabs 28 and 30 enter openings 34 and 32, respectively. As movement proceeds, surface 44 of each tab contacts the rear, longitudinal edge of the corresponding opening.

The entire plate 10 is preferably a unitary molding of suitable plastic, e.g., Nylon, providing a limited degree of flexibility to parts of relatively thin cross section. In any case, tabs 28 and 30 have such flexibility, whereby medial portion 40 of each tab is moved toward front surface 12 by sliding contact with the periphery of openings 34 and 32 as the plates are moved toward contact of the opposed surfaces of side walls 24 and 26. When the side wall surfaces come into contact, shoulder 42 has moved through the openings and medial portion 40 returns to its original position, thereby causing shoulder 42 to engage the inside surface of the side wall adjacent the rear, longitudinal edge of the opening.

The plates on each end of the ganged assembly preferably have a tab and opening on only one side wall, the other side wall being appropriately contoured to provide a trim and finished appearance to the assembly. For example, the plate at the right end of the assembly, indicated in FIG. 2 by reference numeral 10", has a tab and opening only on its left side wall, and its right side wall, being the outermost side wall on the right side of the assembly, is contoured in the manner previously mentioned. The left side wall of the plate at the left end of the assembly would likewise be contoured. It is possible, of course, to have an assembly consisting of only two plates, in which case each plate would have a tab and opening on only the side wall adjacent the other plate, the outer side wall of each plate being contoured or beveled in the manner indicated.

From the foregoing it is apparent that two or more of the disclosed wall plates may be mutually connected with a snap-fit attachment of a pair of tabs on the opposed, contacting side walls of each plate with the side wall of the adjoining plate. When the required number of plates have been mutually assembled, the plates utilized at each end of the assembly have contoured outer edges to provide a finished appearance to the multi-section plate. The plates may be separated, if desired, by flexing the tabs to remove the shoulders from engagement with the side wall of the other plate and pulling the plates apart.

What is claimed is:

1. A wall plate for use with one or more identical, laterally adjacent wall plates in a ganged installation of electrical wiring devices, each of said wall plates comprising:
   a) a body portion having front and rear surfaces bounded by a common periphery having linear, parallel, side edges;
   b) a flange extending rearwardly from each of said side edges to define first and second side walls each having inner and outer surfaces, a uniform, predetermined thickness and free edges in a common plane;
   c) a first tab extending outwardly from said first side wall and having means defining a shoulder parallel to and spaced outwardly from said first side wall by a distance substantially equal to said predetermined thickness;
   d) a first, through opening in said first side wall defined by a periphery configured for insertion therethrough of a tab configured identically to said first tab and positioned on one of said adjacent wall plates, said first tab and first opening being spaced from one another along said first side edge by a predetermined distance;
   e) a second tab and a second opening, respectively identical to said first tab and first opening and spaced from one another along said second side edge by said predetermined distance; and
   f) said first tab being positioned laterally opposite said second opening and said second tab being positioned laterally opposite said first opening, said first and second tabs having limited flexibility for movement of the tabs thereof including their respective shoulders away from a normal position by application of a force and return to said normal position upon removal of said force, said tabs and openings being relatively configured and arranged such that, upon relative, linear movement of said first and second side walls of two of said wall plates into engagement with one another, the first tab of one plate is received in the second opening of the other plate, and the second tab of the other plate is received in the first opening of said one plate, said tabs being flexed by contact of said shoulders of said tabs with the peripheries which define said openings during such movement to provide a positive, snap-fit engagement of said laterally adjacent plates.

2. The wall plate of claim 1 wherein said openings are substantially rectangular, being elongated in directions parallel to the free edges of said side walls.

3. The wall plate of claim 1 wherein said flange extends rearwardly about the entire periphery of said body, having a continuous, rearwardly-facing surface in said common plane.

4. The wall plate of claim 3 wherein said body and flange have substantially rectangular peripheries.

5. The wall plate of claim 4 wherein said front and rear surfaces are planar, and said inner and outer surfaces are planar and perpendicular to said front and rear surfaces.

6. The wall plate of claim 5 wherein said tabs are substantially U-shaped, each having a pair of legs integrally connected to said side walls, and a medial portion including said shoulder.

7. The wall plate of claim 6 wherein said medial portion includes a surface extending from said shoulder in a plane at an acute angle to the planes of said inner and outer surfaces.

8. The wall plate of claim 7 wherein said surface of said medial portion extends from said shoulder angularly towards said common plane.

9. The wall plate of claim 8 wherein said tab legs each have a forwardly-facing surface extending from and in a first plane perpendicular to an adjacent side wall for a distance substantially equal to said predetermined thickness and thence in a second plane extending toward said common plane at an acute angle to said first plane.

10. A wall plate for mating engagement with one or more other, identical laterally adjacent wall plates in a ganged installation of electrical wiring devices, each of said plates comprising:
   a) a substantially rectangular, front wall having forward and rear surfaces in first and second, parallel planes, respectively, and at least one opening for exposure therethrough of a portion of one of said wiring devices;

b) first and second side walls extending rearwardly from said rear surface along opposite sides of said front wall, each of said side walls having an inner and an outer surface in planes parallel to one another and perpendicular to said first and second planes, said side walls being of equal thickness and having rearwardly-facing surfaces in a common, third plane, parallel to said first and second plane;

c) first and second identical tabs extending laterally outwardly from said first and second side walls, each having longitudinal edges, respectively, and generally elongated parallel to the longitudinal edges of said side walls, said first tab being spaced a first distance from one end of said first side wall and said second tab being spaced said first distance from the other end of said second side wall;

d) first and second identical, through openings in said first and second side walls, respectively, and generally elongated parallel to said longitudinal edges, said first opening being spaced by said first distance from the other end of said first side wall and said second opening being spaced by said first distance from the one end of said second side wall, said openings being configured to receive said tabs as two of said plates are moved laterally toward engagement of said first side wall of one plate with said second side wall of the other plate; each of said openings having a longitudinal edge in a common fourth plane parallel to said third plane; and e) means defining a shoulder on each of said tabs spaced by approximately said equal thickness from the adjacent side wall, and an inclined surface on each of said tabs with respect to and intersecting said fourth plane, said tabs each having a limited degree of flexibility, whereby said tabs are flexed by contact of said inclined surfaces with said edges of said openings, and said shoulders on the tabs of each plate being engaged with said inner surface of the opposing side wall of the other plate upon movement of said outer surfaces of said first and second side walls of two of said laterally adjacent plates into mutual contact to effect snap-fit coupling of said adjacent plates.

11. The wall plate of claim 10 wherein said tabs are essentially U-shaped, each including a pair of legs extending integrally from an adjacent side wall, and a medial portion including said shoulder and connecting said legs.

12. The wall plate of claim 11 wherein said shoulder comprises a linear edge portion extending parallel to said longitudinal edges.

13. The wall plate of claim 12 wherein a plane intersecting said edge portion and parallel to said third and fourth planes is located between said third and fourth planes in the unflexed condition of said tabs.

14. The wall plate of claim 13 wherein said openings are substantially rectangular in outline.

15. A wall plate for assembly with one or more laterally adjacent wall plates to provide covering for a ganged installation of electrical wiring devices, each of said wall plates comprising:

a) a body portion having front and rear surfaces bounded by a common periphery having linear, parallel, side edges;

b) a flange extending rearwardly from each of said side edges to define first and second side walls each having inner and outer surfaces, and free edges in a common plane;

c) a first tab extending laterally outwardly from said first side wall, said first side wall having a uniform, predetermined thickness and said first tab having a means defining a shoulder parallel to and spaced outwardly from said first side wall by a distance substantially equal to said predetermined thickness; and d) a first, through opening in said first side wall defined by a periphery configured for insertion therethrough of a tab configured identically to said first tab, said first tab and said opening being spaced from one another along said first side edge by a predetermined distance;

e) each of said tabs having limited flexibility for movement thereof including said shoulder away from a normal position by application of a force and return to said normal position upon removal of said force each of said tabs and opening being relatively configured and arranged such that, upon relative, linear movement of said one side wall into engagement with a side wall of a second plate having a second tab and a second opening spaced from one another by said predetermined distance and respectively configured identically to said first tab and first opening, said first tab is received in said second opening and said second tab is received in said first opening, said tabs being flexed by contact of said shoulders of said tabs with the peripheries which define said openings during such movement to provide a positive, snap-fit engagement of said laterally adjacent plates.

16. The wall plate of claim 15 wherein said front surface of said body wall and said first side wall are each substantially planar and perpendicular to one another.

17. The wall plate of claim 16 wherein said second side wall outer surface is curved.

18. The wall plate of claim 17 wherein said body includes linear, parallel, top and bottom edges, and said flange extends rearwardly from each of said top and bottom edges to define top and bottom walls each having inner and outer surfaces and free edges in said common plane.

* * * * *